Figure 1:
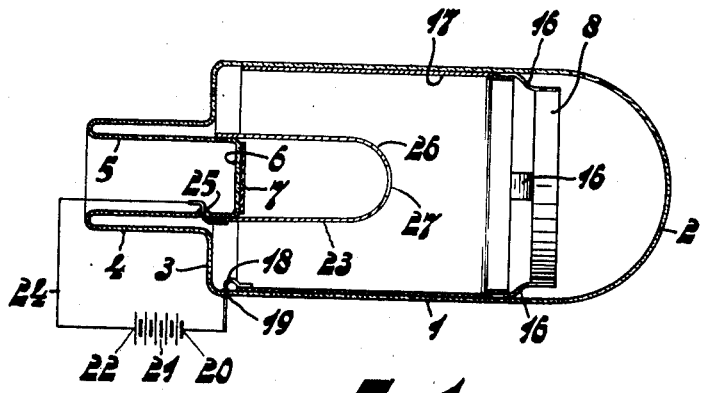

Jan. 4, 1955

M. C. TEVES ET AL 2,698,912

X-RAY IMAGE AMPLIFIER

Filed Dec. 26, 1951

INVENTORS
Marten Cornelis Teves
Taeke Tol
Petrus Cornelis van der Linden
BY
Fred M. Vogel
AGENT

United States Patent Office 2,698,912
Patented Jan. 4, 1955

2,698,912

X-RAY IMAGE AMPLIFIER

Marten Cornelis Teves, Taeke Tol, and Petrus Cornelis van der Linden, Eindhoven, Netherlands, assignors to Hartford National Bank and Trust Company, Hartford, Conn., as trustee Application December 26, 1951, Serial No. 263,228

Claims priority, application Netherlands January 17, 1951

8 Claims. (Cl. 313—65)

This invention relates to an X-ray image amplifier and in particular to an electron-optical image amplifier for producing an amplified image of an image produced on a relatively small fluorescent collecting screen.

More specifically the invention relates to an electron discharge device for amplifying images which are produced on a primary screen arranged in close proximity to a photoelectric cathode so that no optical projection means are required to reproduce the image on the photocathode. The luminescent layer of the screen on which the X-ray image is produced must be capable of absorbing enough X-radiation that its light output is sufficient to release a sufficient quantity of electrons from the photocathode to produce a satisfactory reproduced image on the fluorescent collecting screen. The layer must, in addition, co-operate with the cathode in such manner that there is no loss of detail in the resulting image reproduced on the collecting screen.

The light output of a luminescent screen excited by X-radiation increases with the intensity of the radiation striking the screen. However, as the thickness of the luminescent layer increases the light output of the layer is restricted by the absorption of light in the layer itself with a consequent decrease in the sharpness of the image. The optimum layer thickness for obtaining satisfactory light output and image clarity has been determined to be between 0.2 and 0.7 mm. depending upon the granular size of the luminescent substance and the mean hardness of the radiation. It is the main object of this invention to provide an image amplifier in which maximum light output from the luminescent layer is obtained and reproduced as an amplified image on a collector screen.

Ordinarily, the image produced on a fluoroscopic screen is of a low order of intensity even when the X-ray tube is operated under full load conditions so that the eye must accustom itself to those low intensity levels in order to observe details. When using an image amplifier not only is a brighter image obtainable but it is possible to reduce the load on the X-ray tube and use a longer exposure time without exposing the patient under observation to unnecessary risk of over-exposure.

According to the invention, the primary fluorescent screen comprises a luminescent layer embedded in a silicone which is lucid and transparent and is a monomeride compound which gradually polymerizes at an increasing temperature, is not appreciably volatilized during polymerization, and has a vapor pressure which is lower than $10^{-6}$ Hg. The silicone preferably should have a refractive index of approximately 1.5. The screen is, furthermore in optical contact with the photocathode and forms together with the latter, an immersion system having low light losses due to reflection. The term "optical contact" denotes that the photocathode and screen are operatively arranged, either abutting or apart, such that the radiation produced by the screen can impinge on the photocathode to cause the latter to emit electrons.

The screen is preferably stratified being constituted by a first layer composed of a silicone mixed with a luminescent material and a second layer of pure silicone to which the photocathode is applied. It has been found that about 40 mg. luminescent material per cm.$^2$ requires about 0.045 cm.$^3$ of silicone per cm.$^2$. Subsequent to hardening, the silicone forms a perfectly smooth layer suitable for application of the photocathode thereover. Being heat resistant, the tube can be exhausted at high temperatures without damaging or otherwise deleteriously affecting the silicone. The active material of the photocathode cannot harmfully affect the luminescent material while excellent optical contact between the photocathode and the primary screen is assured.

In order to prevent any possibility of corrosion, a layer of alumina about 20 A. in thickness may be provided between the silicone layer and the photocathode. The alumina layer is impervious to caesium up to a temperature of 220° C.

Figure 2:
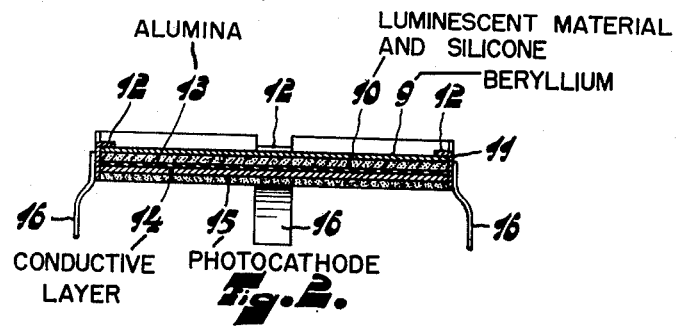

The invention will be described in connection with the drawing in which:

Fig. 1 shows an X-ray image amplifier,

Fig. 2 a screen combinatiaon according to the invention in detail and

Figure 3:
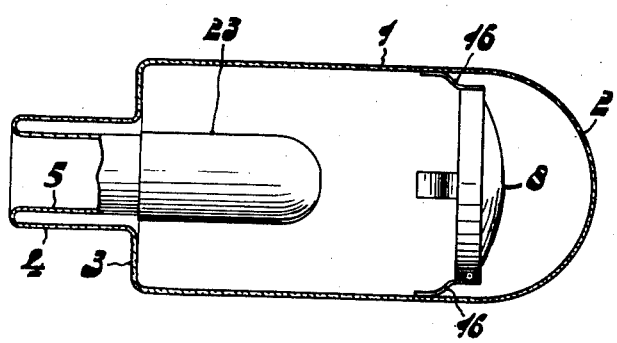

Fig. 3 shows the X-ray image amplifier comprising a curved screen.

The image amplifier comprises a cylindrical glass bulb 1, having a circular cross sectional area, one end of which is closed by a spherical window 2; the other end of which is closed by a flat bottom 3, provided with a cylindrical spout 4, extending to the outside. The open end of the spout communicates with a narrower cylinder 5, extending towards the inner side and is closed by a bottom plate 6. This plate is provided in the interior of the tube with a thin layer of fluorescent material 7, which serves as a collecting screen.

A photocathode screen is provided opposite the collecting screen in the wide portion of the bulb which is struck by X-rays entering the tube through the spherical window 2. The construction of the screen 8 is shown in Fig. 2.

A flat plate 9 constituted by a metal having a low atomic number, for example, aluminum or beryllium, which absorbs X-rays only slightly, serves as a carrier for the luminescent layer 10 and is secured in a metal ring 11. This ring may be provided with tags 12, bent towards the inner side, to which the plate may be secured, for example, by spot welding. The luminescent layer 10 is formed by casting the required quantity of a suspension of a suitable luminescent substance, for example, zinc sulfide or a mixture of zinc sulfide and cadmium sulfide in silicone on the carrier. The mixture ratio in the suspension is such that the interstices between grains of the luminescent substance are completely filled with silicone, so that a smooth surface is formed. There is no objection against adding a slightly greater quantity of silicone to the mixture, so that, after the luminescent substance has settled, a layer of pure silicone is formed thereon. The screen is then heated for about 8 hours up to about 200° C. during which time the silicone polymerizes. Upon cooling it forms a layer having a perfectly smooth surface. The photoelectric cathode is applied to this layer.

The photoelectric cathode may be manufactured from silver activated caesium oxide or from a compound of antimony with caesium oxide and is applied to a thin, good conductive layer preferably of chromium or iridium. A layer of a few Angstroms in thickness is sufficiently conductive, but for such small thickness there is a risk that the caesum will penetrate through the layer and the contact with the substratum of silicone. In order to avoid corrosion of this layer by caesium, it is advisable to apply a thin layer of alumina prior to the application of the conductive film. This alumina layer 13, having a thickness of about 20 to 30 A. is practically transparent. The application may be carried out by vaporizing aluminum in vacuo, subsequent to which the material completely oxidizes to form $Al_2O_3$ in air. Subsequent to mounting the screen in the tube and exhausting it at higher temperature, the conductive layer 14, which may be 5 to 10 A. in thickness and be made of chromium or iridium, is applied by vaporization to the oxide layer thus formed. The light absorption in this layer is less than 5%. Then a quantity of antimony is evaporated in the tube and precipitated on the screen and caesium vapor is introduced, forming with the antimony a photosensitive compound. The photoelectric cathode thus produced is designated by 15. The positioning of the photocathode screen in the tube may be effected in the following manner. A number of resilient members 16, which bear on the tube wall are secured to ring 11. The screen is introduced into the tube and it remains in position because of the resilient force exerted by these members on the wall.

It is preferable to provide a conductive coating 17 on the cylindrical portion of the tube wall, which is in electrical contact with the clamping springs 16. The current supply wire 18, which is taken through the wall of the tube at 19, connects the coating 17 to the negative terminal 20 of a voltage source 21. The positive terminal 22 is connected to the anode 23 through a supply wire 24, which is led through the tube wall at 25. The anode comprises a metal cylinder, which is slipped on the re-entrant part 5. It has a spherical hood 26, which has an aperture 27 to allow the electrons to pass.

When the image amplifier is used, X-rays pass through the window 2 and impinge upon the luminescent layer 10 of the photocathode screen 3. The luminescence produced by this radiation illuminates the photocathode, which consequently emits electrons. These electrons are accelerated and conveyed under the action of the field distribution in the tube through the aperture 27 in the anode 23 to the fluorescent screen 7. There the amplified fluoroscopic image is produced.

In order to improve a favorable field distribution in the tube, which favors the concord between the image produced on the primary screen and the fluorescent image on the collecting screen, it is desirable that the hood 26, which closes the anode 23, and the photocathode screen 3 both be curved and have approximately the same center of curvature, as is shown in Fig. 3. It has been found to be a further advantage of the invention that the curvature of the photocathode manufactured in accordance with the invention for obtaining the desired shape be effected prior to the application of the photoelectric cathode. If binders usually employed for thin screens are used, this operation inevitably gives rise to cracks in the luminescent layer, so that the screen becomes unserviceable.

While the invention has been described in connection with a specific embodiment, other modifications thereof will be readily apparent to one skilled in the art without departing from the spirit and scope of the invention as defined in the appended claims.

What we claim is:

1. An electric discharge tube comprising a photoelectric cathode, a first luminescent screen in close proximity to said cathode responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone, said silicone being a lucid and transparent monomeride compound polymerizing at increased temperatures which is not appreciably evaporated during polymerization and has a vapor pressure lower than $10^{-6}$ mm. Hg.

2. An electric discharge tube comprising a photoelectric cathode, a first luminescent screen in close proximity to said cathode responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone, said silicone being a lucid and transparent monomeride compound having a refractive index exceeding unity polymerizing at increased temperatures and not appreciably evaporating during polymerization and has a vapor pressure lower than $10^{-6}$ mm. Hg.

3. An electric discharge tube comprising a photoelectric cathode comprising a first luminescent screen and a photoelectric layer over said screen, said luminescent screen being responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone and constituting with the photoelectric layer an immersion system, said silicone being a lucid and transparent monomeride compound and having a refractive index exceeding unity and polymerizing at increased temperatures which is not appreciably evaporated during polymerization and has a vapor pressure lower than $10^{-6}$ mm. Hg.

4. An electric discharge tube comprising a photoelectric cathode, a first luminescent screen in close proximity to said cathode responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone and covered with a layer of pure silicone, said silicone being a lucid and transparent monomeride compound polymerizing at increased temperatures which is not appreciably evaporated during polymerization and has a vapor pressure lower than $10^{-6}$ mm. Hg.

5. An electric discharge tube comprising a photoelectric cathode comprising a first luminescent screen, a layer of alumina over said screen and a photoelectric layer over said alumina layer, said screen being responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone, said silicone being a lucid and transparent monomeride compound polymerizing at increased temperatures which is not appreciably evaporated during polymerization and has a vapor pressure lower than $10^{-6}$ mm. Hg.

6. An electric discharge tube comprising a photoelectric cathode comprising a first luminescent screen, a layer of alumina over said screen, a layer of conductive metal over said alumina layer, and a photoelectric layer over said conductive metal layer, said screen being responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone, said silicone being a lucid and transparent monomeride compound polymerizing at increased temperatures which is not appreciably evaporated during polymerization and has a vapor pressure lower than $10^{-6}$ mm. Hg.

7. An electric discharge tube comprising a photoelectric cathode comprising a first luminescent screen, a layer of alumina over said screen, a conductive metal layer over said alumina layer, and a photoelectric layer over said conductive metal layer, said screen being responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a silicone having a refractive index exceeding unity, said silicone being a lucid and transparent monomeride compound polymerizing at increased temperatures and not appreciably evaporated during polymerization and has a vapor pressure lower than $10^{-6}$ mm. Hg.

8. An electric discharge tube comprising a photoelectric cathode comprising a first luminescent screen, a layer of alumina over said screen, a conductive metal layer over said alumina layer, and a photoelectric layer over said conductive metal layer, said screen being responsive to radiation to which the cathode is substantially unresponsive for producing an image to which the photocathode is responsive, and a collector electrode spaced from said cathode comprising a second luminescent screen for electron-optically reproducing images on the first luminescent screen, said first screen comprising a luminescent substance embedded in a layer of silicone and covered with a layer of pure silicone, said silicone being a lucid and transparent monomeride compound having a refractive index exceeding unity and polymerizing at increased temperatures which is not appreciably evaporated during polymerization and has a vapor pressure lower than $10^{-6}$ mm. Hg.

References Cited in the file of this patent

UNITED STATES PATENTS

| 2,423,626 | Szegho | July 8, 1947 |
| 2,451,590 | Tidik et al. | Oct. 19, 1948 |
| 2,523,132 | Mason et al. | Sept. 19, 1950 |